(12) United States Patent
Loughland et al.

(10) Patent No.: US 11,162,236 B2
(45) Date of Patent: Nov. 2, 2021

(54) LIVING MARINE QUAY WALL

(71) Applicant: SAUDI ARABIAN OIL COMPANY, Dhahran (SA)

(72) Inventors: Ronald Anthony Loughland, Dhahran (SA); Michael Patrick Hennigan, Dhahran (SA); Hattan Jaffar Balkhi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 151 days.

(21) Appl. No.: 16/684,836

(22) Filed: Nov. 15, 2019

(65) Prior Publication Data

US 2021/0148073 A1   May 20, 2021

(51) Int. Cl.
*E02B 3/04* (2006.01)
*E02B 3/06* (2006.01)

(52) U.S. Cl.
CPC .............. *E02B 3/046* (2013.01); *E02B 3/066* (2013.01)

(58) Field of Classification Search
CPC .......... E02B 3/046; E02B 3/066; A01K 61/70
See application file for complete search history.

(56) References Cited

U.S. PATENT DOCUMENTS

| | | | |
|---|---|---|---|
| 3,885,364 A | 5/1975 | Lankheet | |
| 5,803,660 A | 9/1998 | Warren et al. | |
| 6,565,283 B1 | 5/2003 | Hall | |
| 6,595,726 B1 | 7/2003 | Egan et al. | |
| 6,896,445 B1 | 5/2005 | Engler | |
| 7,144,196 B1* | 12/2006 | Campbell | E02B 3/046 405/30 |
| 7,762,205 B1 | 7/2010 | Veazey | |
| 7,992,509 B1 | 8/2011 | Veazey | |
| 9,339,017 B1 | 5/2016 | Walter | |
| 10,053,827 B2 | 8/2018 | Martin et al. | |
| 10,138,610 B2 | 11/2018 | Hilton et al. | |
| 2005/0265792 A1 | 12/2005 | Lee | |

(Continued)

FOREIGN PATENT DOCUMENTS

| | | |
|---|---|---|
| JP | H11308939 A | 11/1999 |
| JP | 6467667 B2 | 2/2019 |

(Continued)

OTHER PUBLICATIONS

Derbyshire, Fish Habitat Guideline FHG 006: Fisheries Guidelines for Fish-Friendly Structures, Queensland Government, Department of Primary Industries and Fisheries, Jul. 2006, 65 pgs.

(Continued)

*Primary Examiner* — Sean D Andrish
(74) *Attorney, Agent, or Firm* — Bracewell LLP; Constance G. Rhebergen; Linda L. Morgan (57) ABSTRACT

Embodiments provide a quay wall attachment and a method for promoting biodiversity in a marine environment. The quay wall attachment includes a quad plate and a module. The quad plate is secured to a portion of a quay wall located underwater. The module includes a coral module, a fish module, a plant module, and combinations of the same. The coral module includes living corals and is secured to the quad plate. The fish module includes a hollow space and is secured to the quad plate. The plant module includes living marine plants and a hollow space, and is secured to the quad plate.

12 Claims, 6 Drawing Sheets

(56) References Cited

U.S. PATENT DOCUMENTS

2013/0284106 A1　10/2013　Moewe
2014/0227033 A1　 8/2014　Scheel
2014/0369753 A1　12/2014　Poff
2018/0266065 A1　 9/2018　Leichti et al.

FOREIGN PATENT DOCUMENTS

| KR | 200271975 | Y1 | | 4/2002 |
| --- | --- | --- | --- | --- |
| KR | 582188 | | * | 5/2006 |
| KR | 101193516 | B1 | | 10/2012 |
| KR | 101334910 | B1 | | 11/2013 |
| KR | 101816075 | B1 | | 1/2018 |

OTHER PUBLICATIONS

Anonymous, "Volvo Living Seawall in Sydney Harbour," VolvoCarsAustralia, Oct. 31, 2018: 1 page.
International Search Report and Written Opinion of PCT Application No. PCT/US2020/060341 dated Feb. 12, 2021: pp. 1-13.

* cited by examiner

LIVING MARINE QUAY WALL

BACKGROUND

Field of the Disclosure

Embodiments of the disclosure generally relate to promoting biodiversity in a marine environment. More specifically, embodiments of the disclosure relate to a device and method for promoting biodiversity in a marine environment surrounding quay walls.

Description of the Related Art

Marine devices such as artificial reefs have been developed to establish underwater marine habitats to promote marine life in areas with a generally featureless sea floor, to control erosion, block ship passage, block the use of trawling nets, or improve surfing. Many artificial reefs are built using objects that were built for other purposes, for example by sinking oil rigs, scuttling ships, or by deploying rubble, construction debris, or tires. Other artificial reefs such as reef balls are purposefully built from materials such as polyvinyl chloride or concrete. Shipwrecks may also serve as artificial reefs. In general, artificial reefs provide hard surfaces where algae and invertebrates such as barnacles, corals, and oysters attach. The accumulation of attached marine life in turn provides intricate structure and food for assemblages of fish.

A quay, wharf, or pier is a man-made raised structure in a body of water where vessels berth to load and unload cargo or passengers. These structures are generally vertical and are installed in a body of water having a depth relatively deep enough such that vessels can freely move about the surface.

SUMMARY

Embodiments of the disclosure generally relate to promoting biodiversity in a marine environment. More specifically, embodiments of the disclosure relate to a device and method for promoting biodiversity in a marine environment surrounding quay walls.

Advantageously, the disclosure provides a quay wall attachment that provides nutrient recycling and pollutant uptake. Turbulence caused by propellers of a vessel disrupts and agitates water which in turn circulates oxygen, carbon dioxide, nitrogen, and alkaline-generating calcium carbonate-based species. In this manner, the fauna and flora surrounding the quay wall attachment can flourish.

Advantageously, components of the quay wall attachment are easy to install and are transferable either individually or as a whole.

Embodiments of the disclosure provide a quay wall attachment for promoting biodiversity in a marine environment. The quay wall attachment includes a quad plate and a module. The quad plate has a front surface and a back surface. The front surface is substantially planar. The quad plate has a plurality of first through holes and a plurality of tapped holes. The quad plate is configured to be secured to a portion of a quay wall located underwater using a plurality of first mechanical fasteners via the plurality of first through holes. The module is secured to the front surface of the quad plate. The module includes a coral module, a fish module, a plant module, and combinations of the same. The coral module includes living corals and a first supporting plate. The first supporting plate has a plurality of second through holes. The first supporting plate is configured to be secured to the quad plate using a plurality of second mechanical fasteners via the plurality of second through holes and via the plurality of tapped holes. The living corals are anchored to a surface of the first supporting plate. The fish module includes a first hollow space defined by a first structure including a top wall, a bottom wall, two side walls, a front wall, and a back wall. The front wall includes an opening such that the first hollow space is accessible from the front direction. The back wall has a plurality of third through holes. The back wall is configured to be secured to the quad plate using a plurality of third mechanical fasteners via the plurality of third through holes and via the plurality of tapped holes. The plant module includes living marine plants and a second hollow space. The second hollow space is defined by a second structure including a second supporting plate and a curved plate. The second hollow space is accessible from the top direction. The second supporting plate has a plurality of fourth through holes. The second supporting plate is configured to be secured to the quad plate using a plurality of fourth mechanical fasteners via the plurality of fourth through holes and via the plurality of tapped holes. The living marine plants are anchored to an interior surface of the second structure.

In some embodiments, the back surface has a topography substantially similar to that of the portion of the quay wall to which the quad plate is configured to be secured.

In some embodiments, the quad plate has a width ranging from 0.8 m to 1.2 m and a height ranging from 0.8 m to 1.2 m. In some embodiments, the quad plate has a thickness ranging from 30 mm to 50 mm. In some embodiments, the first supporting plate has a width ranging from 0.3 m to 0.5 m and a height ranging from 0.3 m to 0.5 m. In some embodiments, the first structure has a width ranging from 0.4 m to 1 m, a height ranging from 0.4 m to 1 m, and a depth ranging from 0.2 m to 0.5 m. In some embodiments, the second structure has a width ranging from 0.3 m to 0.5 m, a height ranging from 0.3 m to 0.5 m, and a depth ranging from 0.1 m to 0.3 m.

In some embodiments, the quad plate includes fiberglass reinforced plastic. In some embodiments, the first supporting plate includes fiberglass reinforced plastic. In some embodiments, the first structure includes fiberglass reinforced plastic. In some embodiments, the second structure includes fiberglass reinforced plastic.

Embodiments of the disclosure also provide a method for promoting biodiversity in a marine environment adjacent to a quay wall. The method includes the step of securing a quay wall attachment to a portion of the quay wall located underwater. The quay wall attachment includes a quad plate and a module. The quad plate has a front surface and a back surface. The front surface is substantially planar. The quad plate has a plurality of first through holes and a plurality of tapped holes. The quad plate is secured to the portion of the quay wall using a plurality of first mechanical fasteners via the plurality of first through holes. The module is secured to the front surface of the quad plate. The module includes a coral module, a fish module, a plant module, and combinations of the same. The coral module includes living corals and a first supporting plate. The first supporting plate has a plurality of second through holes. The first supporting plate is secured to the quad plate using a plurality of second mechanical fasteners via the plurality of second through holes and via the plurality of tapped holes. The living corals are anchored to a surface of the first supporting plate. The fish module includes a first hollow space defined by a first structure including a top wall, a bottom wall, two side walls, a front wall, and a back wall. The front wall includes an opening such that the first hollow space is accessible from the front direction. The back wall has a plurality of third through holes. The back wall is secured to the quad plate using a plurality of third mechanical fasteners via the plurality of third through holes and via the plurality of tapped holes. The plant module includes living marine plants and a second hollow space. The second hollow space is defined by a second structure including a second supporting plate and a curved plate. The second hollow space is accessible from the top direction. The second supporting plate has a plurality of fourth through holes. The second supporting plate is secured to the quad plate using a plurality of fourth mechanical fasteners via the plurality of fourth through holes and via the plurality of tapped holes. The living marine plants are anchored to an interior surface of the second structure.

In some embodiments, the method further includes the step of placing an alignment plate on a surface of the portion of the quay wall. The alignment plate has a dimension substantially similar to the quad plate. The method further includes the step of drilling blind holes on the surface of the portion of the quay wall using the alignment plate. The method further includes the step of removing the alignment plate. In some embodiments, the method further includes the step of installing spacers between the quad plate and the portion of the quay wall to relieve the quad plate from mechanical stress.

In some embodiments, the quad plate has a width ranging from 0.8 m to 1.2 m and a height ranging from 0.8 m to 1.2 m. In some embodiments, the quad plate has a thickness ranging from 30 mm to 50 mm. In some embodiments, the first supporting plate has a width ranging from 0.3 m to 0.5 m and a height ranging from 0.3 m to 0.5 m. In some embodiments, the first structure has a width ranging from 0.4 m to 1 m, a height ranging from 0.4 m to 1 m, and a depth ranging from 0.2 m to 0.5 m. In some embodiments, the second structure has a width ranging from 0.3 m to 0.5 m, a height ranging from 0.3 m to 0.5 m, and a depth ranging from 0.1 m to 0.3 m.

In some embodiments, the quad plate includes fiberglass reinforced plastic. In some embodiments, the first supporting plate includes fiberglass reinforced plastic. In some embodiments, the first structure includes fiberglass reinforced plastic. In some embodiments, the second structure includes fiberglass reinforced plastic.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

In the accompanying Figures, similar components or features, or both, may have a similar reference label.

DETAILED DESCRIPTION

The disclosure refers to particular features, including a device, system, or apparatus and process or method steps. Those of skill in the art understand that the disclosure is not limited to or by the description of embodiments given in the specification. The subject matter of the disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms describe the relative position of an object or a group of objects relative to another object or group of objects. The spatial relationships apply along vertical and horizontal axes. Orientation and relational words, including "top," "side," "bottom," "above," "below," "front," "back," and other like terms, are for descriptive convenience and are not limiting unless otherwise indicated.

As used throughout the disclosure, the term "marine environment" refers to any type of body of water including but not limited to marine (including oceanic zones, benthic zone, intertidal zones, neritic zones, estuaries, salt marshes, coral reefs, lagoons, and mangrove swamps) and freshwater (including lentic, lotic, wetlands, and ponds).

Figure 1:
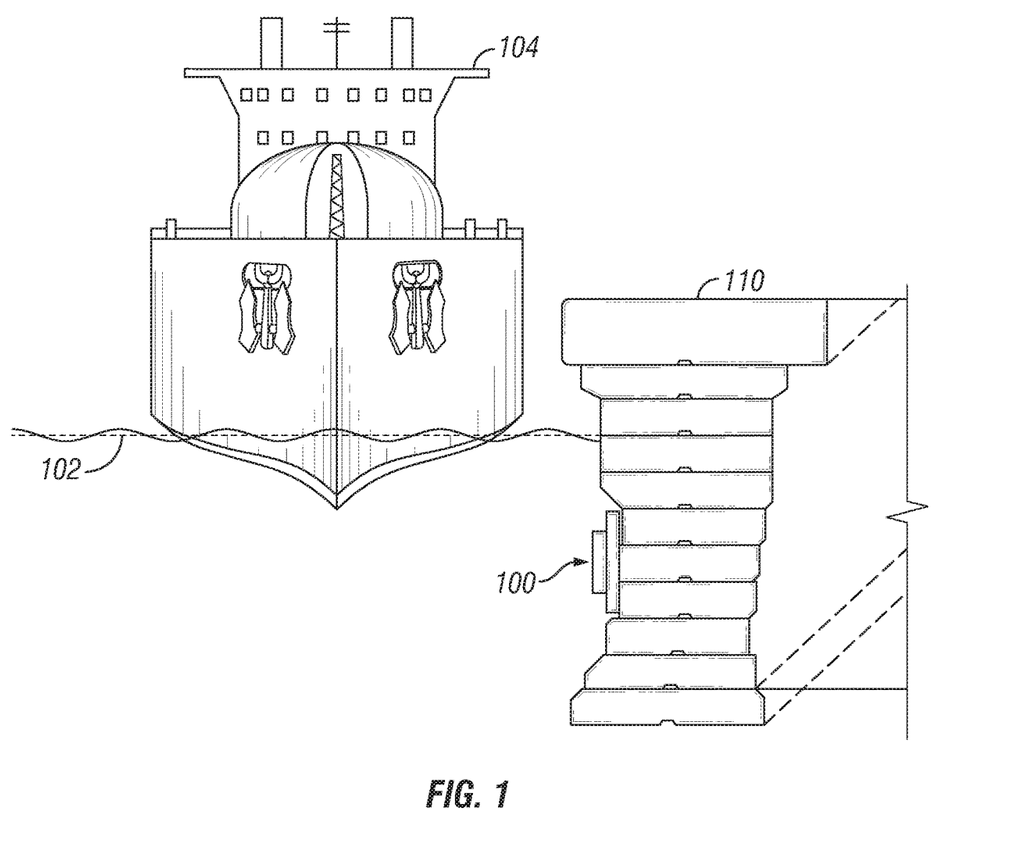
FIG. 1 shows a graphical representation of a quay wall attachment according to an embodiment of the disclosure.

Embodiments of the disclosure provide a quay wall attachment 100 for promoting biodiversity in a marine environment. As shown in FIG. 1, the quay wall attachment 100 is secured to an existing quay wall 110. The quay wall attachment 100 is located below the seawater level 102. In some embodiments, the quay wall attachment 100 is located below the highest tidal level such that the quay wall attachment 100 is at least partially submerged during a high tide. Advantageously, tidal movements allow the transfer of nutrients and carbon to the quay wall attachment 100 area. Creating cavity areas in the quay wall 110 by installing the quay wall attachment 100 provides habitable zones and protection for invertebrates that can recycle nutrients and uptake carbon, similar to coral reef walls. Nutrient recycling produces chemicals that attract other marine life which can also uptake carbon. In addition, propeller movement of a docking or undocking marine vessel 104 provides ample oxygen and enhances the transfer and distribution of the nutrients to the quay wall attachment 100 area. Advantageously, the presence of invertebrates and nutrients colonizing on the quay wall attachment 100 attracts various fish species to inhabit in or adjacent to the quay wall attachment 100 area creating a complex ecosystem for restoring the marine environment. Advantageously, structural integrity of the quay wall 110 is not compromised by the installation of the quay wall attachment 100.

Figure 2A:
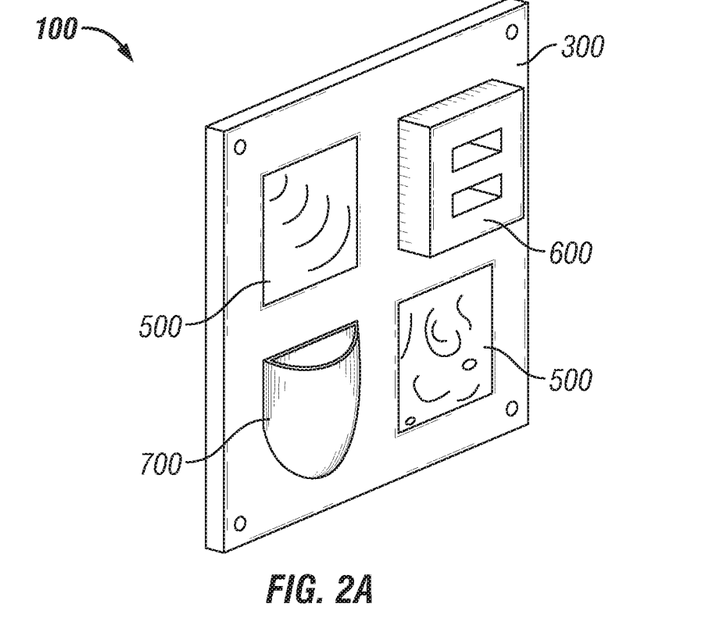
FIGS. 2A-D show perspective views of a quay wall attachment according to an embodiment of the disclosure.
Figure 2B:
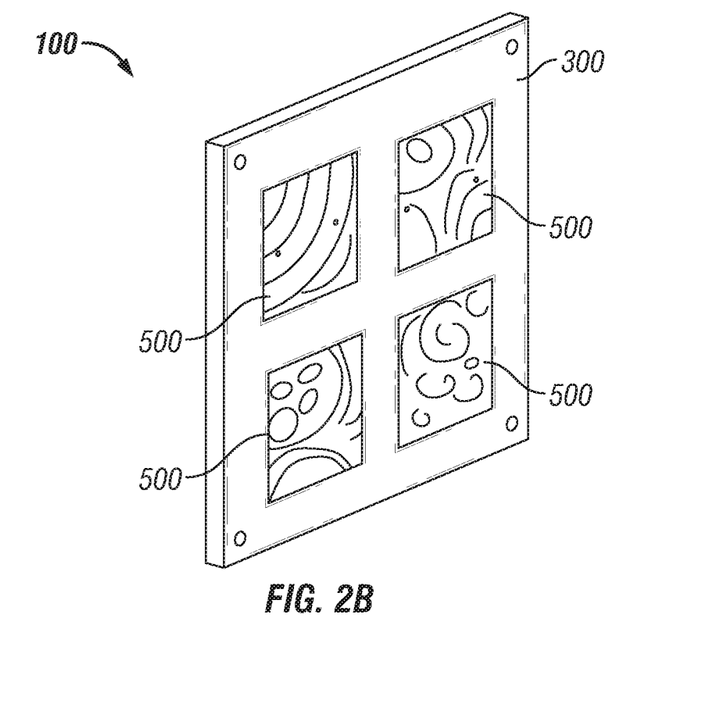
Figure 2C:
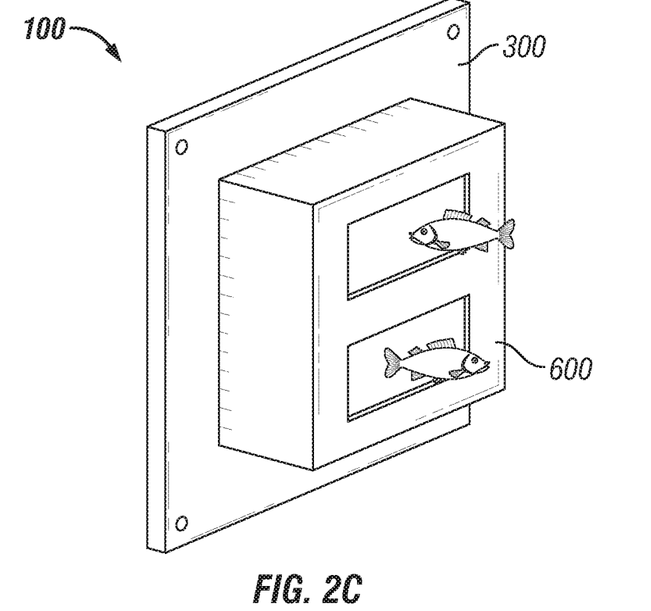
Figure 2D:
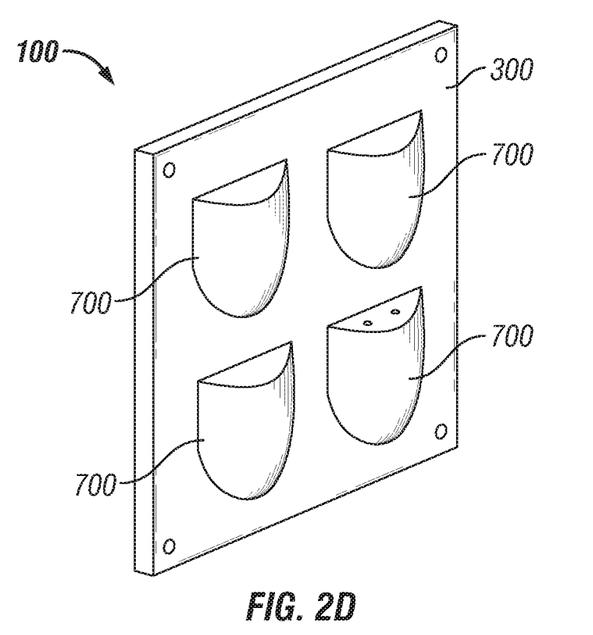

FIGS. 2A-D show perspective views of the quay wall attachment 100 according to an embodiment of the disclosure. The quay wall attachment 100 is secured to a portion of an existing quay wall 110. The quay wall attachment 100 includes a quad plate 300 secured to the quay wall 110. The quay wall attachment 100 can include a coral module 500, a fish module 600, a plant module 700, and combinations of the same. The quay wall attachment 100 shown in FIG. 2A includes four modules secured to the quad plate 300; however, one skilled in the relevant art would recognize that the quay wall attachment 100 can include greater or lesser than four modules secured to the quad plate 300. The quay wall attachment 100 shown in FIG. 2A includes two coral modules 500, one fish module 600, and one plant module 700; however, one skilled in the relevant art would recognize that the quay wall attachment 100 can include greater or less than two coral modules 500, greater or less than one fish module 600, and greater or less than one plant module 700. For example, FIG. 2B shows a quay wall attachment 100 including four coral modules 500. FIG. 2C shows a quay wall attachment 100 including one fish module 600. FIG. 2D shows a quay wall attachment 100 including four plant modules 700.

Figure 3:
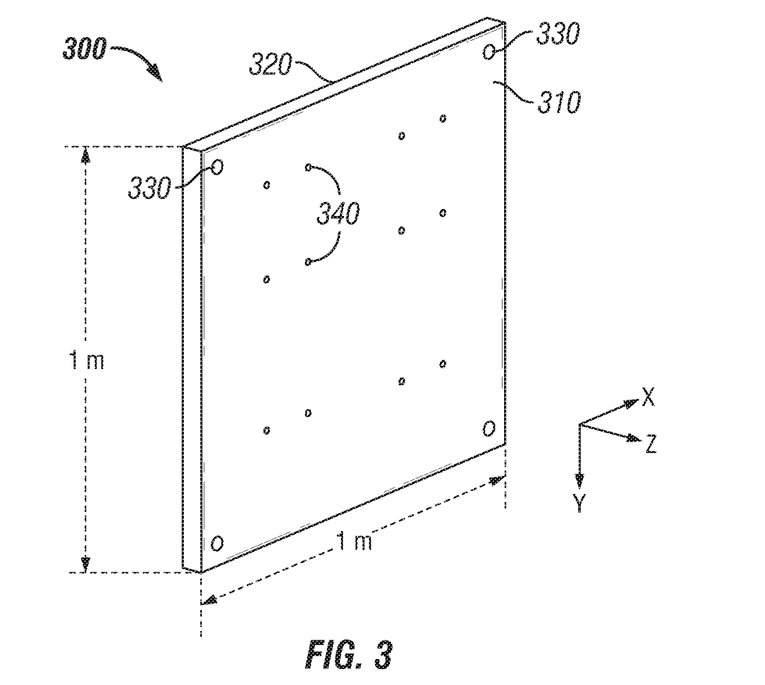
FIG. 3 shows a perspective view of a quad plate according to an embodiment of the disclosure.

FIG. 3 shows a perspective view of the quad plate 300 according to an embodiment of the disclosure. Non-limiting example materials used for the quad plate 300 include fiberglass reinforced plastic (FRP). One skilled in the relevant art would recognize that materials having mechanical properties comparable to FRP can be used for the quad plate 300. The quad plate 300 has a front surface 310 and a back surface 320. The quad plate 300 can have a width (corresponding to the x-axis of FIG. 3) ranging from about 0.1 meter (m) to about 10 m, alternately from about 0.5 m to about 2 m, and alternately from about 0.8 m to about 1.2 m. The quad plate 300 can have a height (corresponding to the y-axis of FIG. 3) ranging from about 0.1 m to about 10 m, alternately from about 0.5 m to about 2 m, and alternately from about 0.8 m to about 1.2 m. In at least one embodiment, as shown in FIG. 3, the quad plate 300 has a width of about 1 m and a height of about 1 m. The quad plate 300 can have a thickness (corresponding to the z-axis of FIG. 3) ranging from about 10 millimeters (mm) to about 100 mm, alternately from about 20 mm to about 80 mm, and alternately from about 30 mm to about 50 mm. In some embodiments, the back surface 320 is substantially planar. In other embodiments, the back surface 320 can have a topography substantially similar to that of the quay wall 110 to which the quad plate 300 is secured. The front surface 310 is substantially planar. The quad plate 300 can include through holes 330 at various locations. In at least one embodiment, as shown in FIG. 3, the through holes 330 are located on the four corners of the quad plate 300. The through holes 330 can be tapped or untapped. The quay wall 110 can include blind holes (not shown) at corresponding locations of the through holes 330 for securing the quad plate 300 to the quay wall 110 using conventional means such as a mechanical fastener. The blind holes can be tapped or untapped. The quad plate 300 can include tapped holes 340 for securing any of the coral module 500, the fish module 600, and the plant module 700. The tapped holes 340 can be through holes or blind holes. In some embodiments, the through holes 330 and the tapped holes 340 are drilled prior to the installation of the quad plate 300 to the quay wall 110. One skilled in the relevant art would recognize that the quad plate 300 can be of any two-dimensional shape capable of being secured to the quay wall 110.

Figure 4:
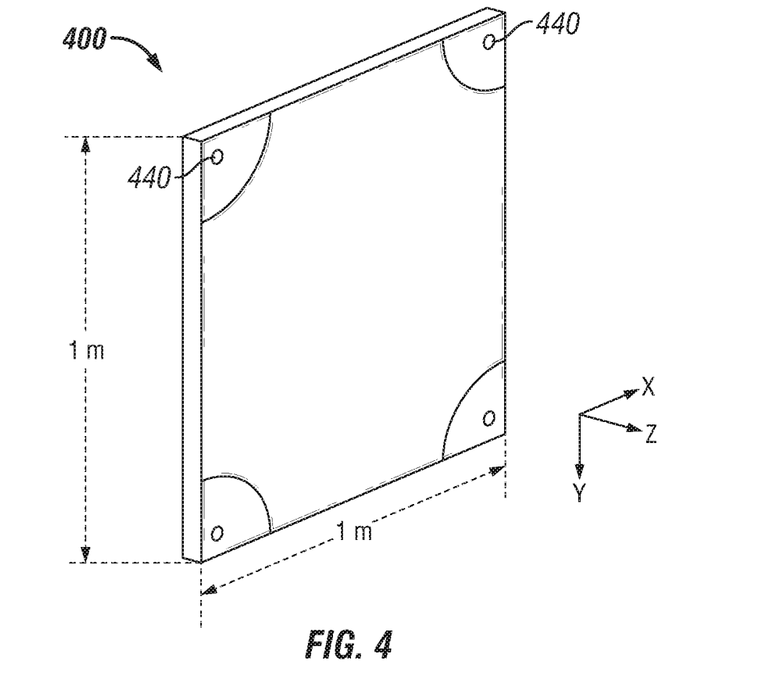
FIG. 4 shows a perspective view of an alignment plate according to an embodiment of the disclosure.

FIG. 4 shows a perspective view of an alignment plate 400 used for underwater installation of the quad plate 300 to the quay wall 110 according to an embodiment of the disclosure. Non-limiting example materials used for the alignment plate 400 include wood (timber frame) and stainless steel. One skilled in the relevant art would recognize that materials having mechanical properties comparable to wood and stainless steel can be used for the alignment plate 400. The alignment plate 400 has a dimension substantially similar to the quad plate 300. The alignment plate 400 can have a width (corresponding to the x-axis of FIG. 4) ranging from about 0.1 m to about 10 m, alternately from about 0.5 m to about 2 m, and alternately from about 0.8 m to about 1.2 m. The alignment plate 400 can have a height (corresponding to the y-axis of FIG. 4) ranging from about 0.1 m to about 10 m, alternately from about 0.5 m to about 2 m, and alternately from about 0.8 m to about 1.2 m. In at least one embodiment, as shown in FIG. 3, the alignment plate 400 has a width of about 1 m and a height of about 1 m. The alignment plate 400 can have a thickness (corresponding to the z-axis of FIG. 4) ranging from about 1 mm to about 50 mm, alternately from about 3 mm to about 30 mm, and alternately from about 5 mm to about 20 mm. In at least one embodiment, the alignment plate 400 has a thickness of about 10 mm. The alignment plate 400 can include through holes 440. The location of the through holes 440 correspond to that of the through holes 330 of the quad plate 300. Before the installation of the quad plate 300, the alignment plate 400 is temporarily placed on the quay wall 110. Blind holes (not shown) can be drilled on the surface of the quay wall 110 via the through holes 440 of the alignment plate 400. Once the blind holes are drilled on the surface of the quay wall 110, the alignment plate 400 can be removed and the quad plate 320 can be secured to the quay wall 110. In the event the back surface 320 of the quad plate 300 is planar and the surface of the quay wall 110 is undulated, spacers (not shown) can be used between the quad plate 300 and the quay wall 110 to relieve the quad plate 300 from mechanical stress upon installation.

Figure 5:
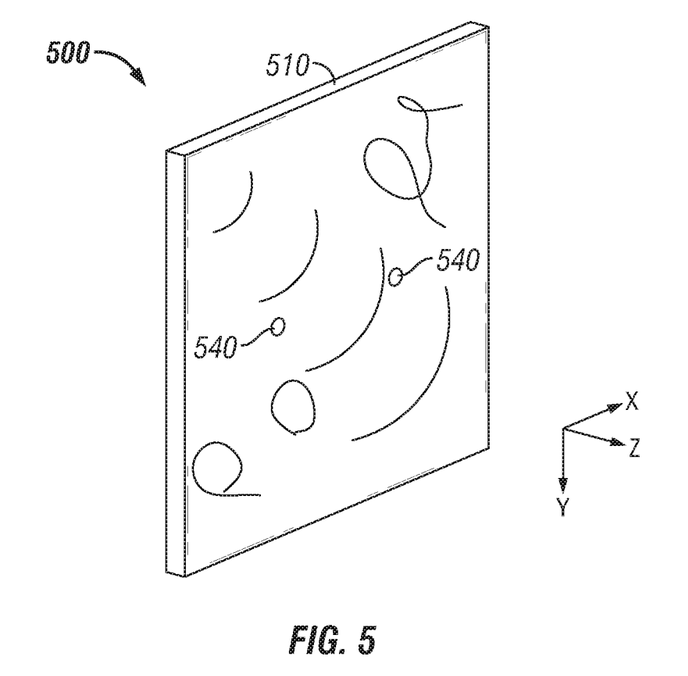
FIG. 5 shows a perspective view of a coral module according to an embodiment of the disclosure.

FIG. 5 shows a perspective view of the coral module 500 according to an embodiment of the disclosure. The coral module 500 includes a supporting plate 510. Non-limiting example materials used for the supporting plate 510 include FRP. One skilled in the relevant art would recognize that materials having mechanical properties comparable to FRP can be used for the coral module 500. The supporting plate 510 can have a width (corresponding to the x-axis of FIG. 5) ranging from about 0.1 m to about 5 m, alternately from about 0.2 m to about 1 m, and alternately from about 0.3 m to about 0.5 m. The supporting plate 510 can have a height (corresponding to the y-axis of FIG. 5) ranging from about 0.1 m to about 5 m, alternately from about 0.2 m to about 1 m, and alternately from about 0.3 m to about 0.5 m. In at least one embodiment, as shown in FIG. 5, the supporting plate 510 has a width of about 0.4 m and a height of about 0.4 m. The supporting plate 510 is substantially planar. The supporting plate 510 can include through holes 540 for securing the coral module 500 to the quad plate 300 using conventional means such as a mechanical fastener. The through holes 540 can be tapped or untapped. The location of the through holes 540 correspond to that of the tapped holes 340 of the quad plate 300. One skilled in the relevant art would also recognize that the supporting plate 510 can be of any two-dimensional shape capable of being secured to the quad plate 300.

The coral module 500 includes living corals anchoring to the surface of the supporting plate 510. As used throughout the disclosure, the term "corals" include coralline algae and invertebrates such as corals, oysters, mussels, serpulidae worms, and barnacles, which are capable of depositing a calcium carbonate skeleton onto the surface of the supporting plate 510. The corals can exist in a mature form or at earlier stages of coral growth. In some embodiments, the coral module 500 can be replaced with a new one in the event the corals are mature, overgrown, or damaged. For example, the coral module 500 having mature corals can be detached from the quad plate 300 and relocated to an area where corals are depleted and required, such as reefs or other vertical marine structures.

Figure 6:
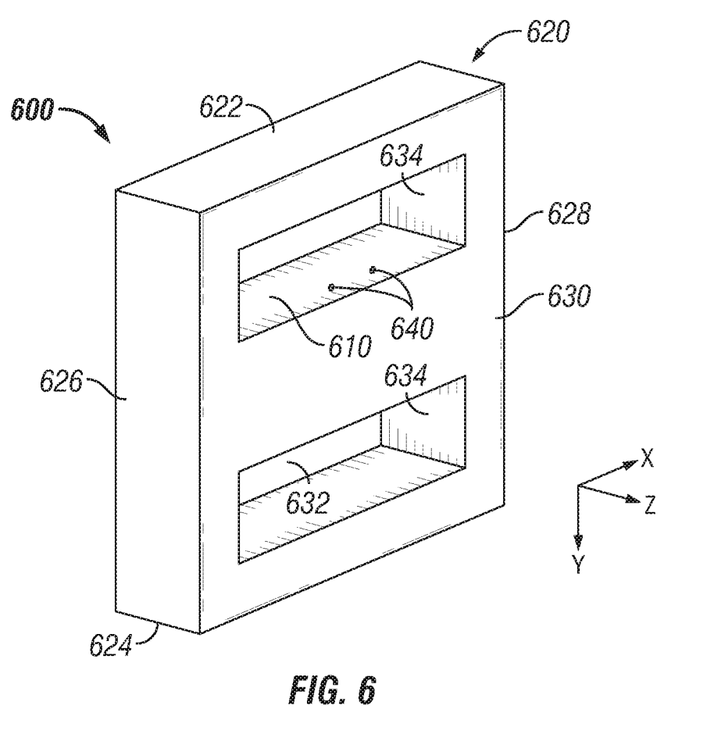
FIG. 6 shows a perspective view of a fish module according to an embodiment of the disclosure.

FIG. 6 shows a perspective view of the fish module 600 according to an embodiment of the disclosure. Non-limiting example materials used for the fish module 600 include FRP. One skilled in the relevant art would recognize that materials having mechanical properties comparable to FRP can be used for the fish module 600. The fish module 600 includes a hollow space 610. In some embodiments, as shown in FIG. 6, the hollow space 610 is created by a box-like structure 620 including a top wall 622, a bottom wall 624, two side walls 626, 628, a front wall 630, and a back wall 632. The box-like structure 620 can have a width (corresponding to the x-axis of FIG. 6) ranging from about 0.1 m to about 10 m, alternately from about 0.3 m to about 2 m, and alternately from about 0.4 m to about 1 m. The box-like structure 620 can have a height (corresponding to the y-axis of FIG. 6) ranging from about 0.1 m to about 10 m, alternately from about 0.3 m to about 2 m, and alternately from about 0.4 m to about 1 m. The box-like structure 620 can have a depth (corresponding to the z-axis of FIG. 6) ranging from about 0.1 m to about 1 m, alternately from about 0.2 m to about 0.7 m, and alternately from about 0.2 m to about 0.5 m. In at least one embodiment, as shown in FIG. 6, the box-like structure 620 has a width of about 0.8 m, a height of about 0.8 m, and a depth of about 0.4 m. The front wall 630 includes one or more openings 634. The openings 634 can be of any shape of any size capable of allowing fish to access the hollow space 610. In some embodiments, fish having a size greater than the openings 634 are prevented from accessing the hollow space 610 such that fish having a size smaller than that of the openings 634 can be protected within the hollow space 610. The back wall 632 can include through holes 640 for securing the fish module 600 to the quad plate 300 using conventional means such as a mechanical fastener. The through holes 640 can be tapped or untapped. The location of the through holes 640 correspond to that of the tapped holes 340 of the quad plate 300. One skilled in the relevant art would recognize that the fish module 600 can be of any three-dimensional shape capable of being secured to the quad plate 300. One skilled in the relevant art would also recognize that the fish module 600 can be of any three-dimensional shape that includes the hollow space 610 and the openings 634 for fish access. In some embodiments, the fish module 600 can be a permanent fixture to the quad plate 300. Advantageously, the fish module 600 provides sheltered environment at the quay wall or other vertical marine structures and allows fauna to develop to a size less susceptible to predators.

Figure 7:
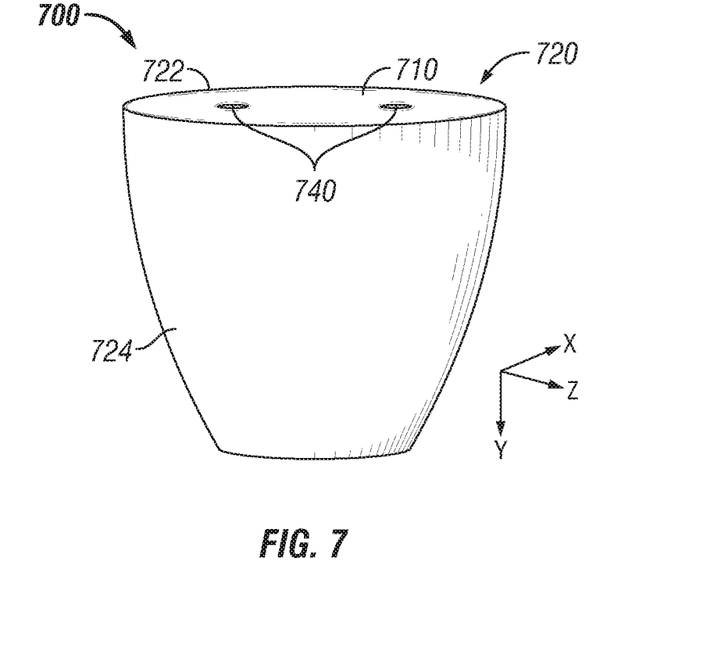
FIG. 7 shows a perspective view of a plant module according to an embodiment of the disclosure.

FIG. 7 shows a perspective view of the plant module 700 according to an embodiment of the disclosure. The plant module 700 includes a hollow space 710 open from the top. In some embodiments, as shown in FIG. 7, the hollow space 710 is created by a pocket-like structure 720 including a supporting plate 722 and a curved plate 724. The curved plate 724 can have a hemi-paraboloid-like shape. Non-limiting example materials used for the pocket-like structure 720 include FRP and wire mesh. One skilled in the relevant art would recognize that materials having mechanical properties comparable to FRP and wire mesh can be used for the pocket-like structure 720. The pocket-like structure 720 can have a width (corresponding to the x-axis of FIG. 7) ranging from about 0.1 m to about 5 m, alternately from about 0.2 m to about 1 m, and alternately from about 0.3 m to about 0.5 m. The pocket-like structure 720 can have a height (corresponding to the y-axis of FIG. 7) ranging from about 0.1 m to about 5 m, alternately from about 0.2 m to about 1 m, and alternately from about 0.3 m to about 0.5 m. The pocket-like structure 720 can have a depth (corresponding to the z-axis of FIG. 7) ranging from about 0.1 m to about 1 m, alternately from about 0.1 m to about 0.5 m, and alternately from about 0.1 m to about 0.3 m. In at least one embodiment, as shown in FIG. 7, the pocket-like structure 720 has a width of about 0.4 m, a height of about 0.4 m, and a depth of about 0.2 m. The supporting plate 722 can include through holes 740 for securing the plant module 700 to the quad plate 300 using conventional means such as a mechanical fastener. The through holes 740 can be tapped or untapped. The location of the through holes 740 correspond to that of the tapped holes 340 of the quad plate 300. One skilled in the relevant art would recognize that the plant module 700 can be of any three-dimensional shape capable of being secured to the quad plate 300. One skilled in the relevant art would also recognize that the plant module 700 can be of any three-dimensional shape that includes the hollow space 710 and is open from the top for marine plant growth.

The plant module 700 includes living marine plants secured in the hollow space 710. As used throughout the disclosure, the term "marine plants" include seagrass (such as posidoniaceae, zosteraceae, hydrocharitaceae, and cymodoceaceae), seaweed (or macroscopic marine algae such as rhodophyta, phaeophyta, and chlorophyta macroalgae), and other aquatic sessile organisms that are capable of photosynthesis in a marine environment. The holdfast of the marine plant anchors the marine plant to the substrate, which corresponds to the interior surface of the pocket-like structure 720. The marine plants can exist in a mature form or at earlier stages of plant growth. In some embodiments, the plant module 700 can be replaced with a new one in the event the marine plants are mature, overgrown, or damaged. For example, the plant module 700 having mature marine plants can be detached from the quad plate 300 and relocated to an area where marine flora are depleted and required, such as reefs or other vertical marine structures.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for promoting biodiversity in a marine environment adjacent to a quay wall, the method comprising the step of:
   securing a quay wall attachment to a portion of the quay wall located underwater, wherein the quay wall attachment comprises:
   a quad plate, the quad plate having a front surface and a back surface, the front surface being substantially planar, the quad plate having a plurality of first through holes and a plurality of tapped holes, wherein the quad plate is secured to the portion of the quay wall using a plurality of first mechanical fasteners via the plurality of first through holes; and
   a module secured to the front surface of the quad plate, the module selected from the group consisting of: a coral module, a fish module, a plant module, and combinations of the same,
   wherein the coral module comprises living corals and a first supporting plate, the first supporting plate having a plurality of second through holes, wherein the first supporting plate is secured to the quad plate using a plurality of second mechanical fasteners via the plurality of second through holes and via the plurality of tapped holes, wherein the living corals are anchored to a surface of the first supporting plate,
   wherein the fish module comprises a first hollow space defined by a first structure including a top wall, a bottom wall, two side walls, a front wall, and a back wall, the front wall comprising an opening such that the first hollow space is accessible from a front direction, the back wall having a plurality of third through holes, wherein the back wall is secured to the quad plate using a plurality of third mechanical fasteners via the plurality of third through holes and via the plurality of tapped holes,
   wherein the plant module comprises living marine plants and a second hollow space, the second hollow space defined by a second structure including a second supporting plate and a curved plate, the second hollow space accessible from a top direction, the second supporting plate having a plurality of fourth through holes, wherein the second supporting plate is secured to the quad plate using a plurality of fourth mechanical fasteners via the plurality of fourth through holes and via the plurality of tapped holes, wherein the living marine plants are anchored to an interior surface of the second structure.

2. The method of claim 1, further comprising the steps of:
   placing an alignment plate on a surface of the portion of the quay wall, the alignment plate having a dimension substantially similar to a dimension of the quad plate;
   drilling blind holes on the surface of the portion of the quay wall using the alignment plate; and
   removing the alignment plate.

3. The method of claim 1, further comprising the step of:
   installing spacers between the quad plate and the portion of the quay wall to relieve the quad plate from mechanical stress.

4. The method of claim 1, wherein the quad plate has a width ranging from 0.8 m to 1.2 m and a height ranging from 0.8 m to 1.2 m.

5. The method of claim 1, wherein the quad plate has a thickness ranging from 30 mm to 50 mm.

6. The method of claim 1, wherein the first supporting plate has a width ranging from 0.3 m to 0.5 m and a height ranging from 0.3 m to 0.5 m.

7. The method of claim 1, wherein the first structure has a width ranging from 0.4 m to 1 m, a height ranging from 0.4 m to 1 m, and a depth ranging from 0.2 m to 0.5 m.

8. The method of claim 1, wherein the second structure has a width ranging from 0.3 m to 0.5 m, a height ranging from 0.3 m to 0.5 m, and a depth ranging from 0.1 m to 0.3 m.

9. The method of claim 1, wherein the quad plate comprises fiberglass reinforced plastic.

10. The method of claim 1, wherein the first supporting plate comprises fiberglass reinforced plastic.

11. The method of claim 1, wherein the first structure comprises fiberglass reinforced plastic.

12. The method of claim 1, wherein the second structure comprises fiberglass reinforced plastic.

* * * * *